Aug. 15, 1944.  J. A. SHARPE  2,355,826
SEISMIC PROSPECTING
Filed Nov. 12, 1941  2 Sheets-Sheet 2

Inventor:
Joseph A. Sharpe
By Paul F. Hawley
Patent Agent

Patented Aug. 15, 1944

2,355,826

UNITED STATES PATENT OFFICE 2,355,826

SEISMIC PROSPECTING

Joseph A. Sharpe, Tulsa, Okla., assignor to Stanolind Oil and Gas Company, Tulsa, Okla., a corporation of Delaware Application November 12, 1941, Serial No. 418,705

5 Claims. (Cl. 177—352)

This invention pertains to the art of seismic prospecting, more particularly to improvements in that branch of the art known as correlation prospecting.

In correlation seismic prospecting charges of explosive are detonated near the surface of the earth at a series of predetermined stations and the seismic waves reflected from subsurface horizons, i. e., interfaces between beds of different elastic properties or different densities are recorded as a function of time at each of these stations. The resultant records are studied for the occurrence of recorded seismic waves which have approximately the same characteristic shape, by which the computer can recognize that they are reflections from the same interface. Knowing the travel time of these reflections and the velocity of seismic waves through the various beds involved the computer can determine the variation in depth of each correlatable interface from station to station. This type of surveying depends for its efficacy upon the fact that the various reflections have recognizable characteristics so that in following the course of a bed it is not necessary to employ continuous prospecting. Obviously if the recognizable characteristics change from point to point the value of the method is greatly diminished because it becomes impossible to identify the reflections from station to station.

It has been recognized in some regions that, although the beds were apparently continuous in so far as geological information could be employed, the recognizable characteristics or so-called "character" of the various reflected waves change markedly between stations a few thousands of feet apart, with no apparent ascribable cause. Using the prior art technique it was impossible to survey such areas by the correlation method and the much more expensive and time-consuming continuous profiling method had to be used.

I have found that a major cause for the changes in character of the reflected seismic waves as observed on the records obtained from various shots at various locations is the difference in depth and mechanical characteristics of the so-called weathered layer or low velocity zone. This zone comprises that portion of the geologic column immediately below the surface, in which the compressional seismic wave velocities range from approximately 500 feet per second to about 2500 feet per second, in contrast to the velocities just below this zone which are fairly constant for a given geological area with values ranging from 5000 to 10,000 feet per second for different areas. The thickness of the low velocity zone varies from a few feet to several hundred feet. Within this weathered zone the velocity will vary with depth either gradually and continuously, or discontinuously, depending upon the history of deposition of the various materials and their elastic constants. The zone generally lies above the water table; it is the zone of cultivation, or organic material, of frost action and of flushing by surface waters.

The materials composing this zone are quite incompetent geologically and highly variable laterally as well as vertically. In general, the elastic constants, the viscosity, the coefficient of internal friction, the density and the other mechanical constants of the materials have values ranging from one-fourth to one-hundredth of their value in the deeper, better consolidated material.

In the transmission of elastic waves through the high velocity material of the lower portion of the geologic column, the characteristics are only slightly changed. However, in the propagation of reflections through the imperfectly elastic, rapidly variable, low velocity zone, extreme changes occur. In this zone dispersion occurs and both amplitude and phase distortion take place. As a result of lateral variations in this zone an otherwise identical reflection impinging on the bottom of this zone will arrive at the surface at two spaced stations quite changed in appearance, due to the difference in the vertical distribution of physical properties and thickness of the materials in the low velocity zone at the two stations.

It is an object of this invention to decrease, and in some cases to eliminate differences in identifiable characteristics of reflected seismic waves arriving at a number of spaced stations by an elimination of the distortion in such waves due to their passage through the low velocity or weathered zone.

It is a further object of this invention to provide a method and apparatus for the determination of the transmission characteristics of the weathered zone.

Another object of this invention is to provide a method and apparatus whereby the distortion in the wave shape of reflected or refracted seismic waves due to passage of such waves through the weathered zone can be reduced to an approximately constant value, thereby affecting the seismic records at all stations by the same amount.

In general I accomplish these objects by determining the transmission characteristics of the weathered layer at the various stations at which records are to be obtained, and deliberately introducing into the seismic wave recording system a correcting system which either eliminates the distortion in wave form due to the weathered layer or reduces it to a uniform value.

Description of this invention is facilitated by reference to the appended drawings which form a part of this specification and which are to be read in connection therewith. In these drawings the same reference character in various figures refers to the same or corresponding part.

In general it can be said that the transmission characteristic of the low velocity zone is low-pass in nature, that is, the high frequencies present in any particular seismic wave train are attenuated more than the low frequencies. This transmission characteristic is a function of the mechanical constants of the earth and also of the vertical rate of change of these parameters. As is the case in any such propagation system, the amplitude and phase transmission characteristics are uniquely related.

I have discovered a method of determining the amplitude and the phase transmission characteristics of the weathered zone accurately and expeditiously. I have also found that it is possible to insert corrective electrical networks in the various seismic amplifying and recording circuits the characteristics of which are in general inverse to those of the weathered zone, and that thereby I can reduce the low velocity zone distortion of the wave form of the various reflected seismic wave trains to a known constant or can, if desired, eliminate it entirely.

Figure 1:
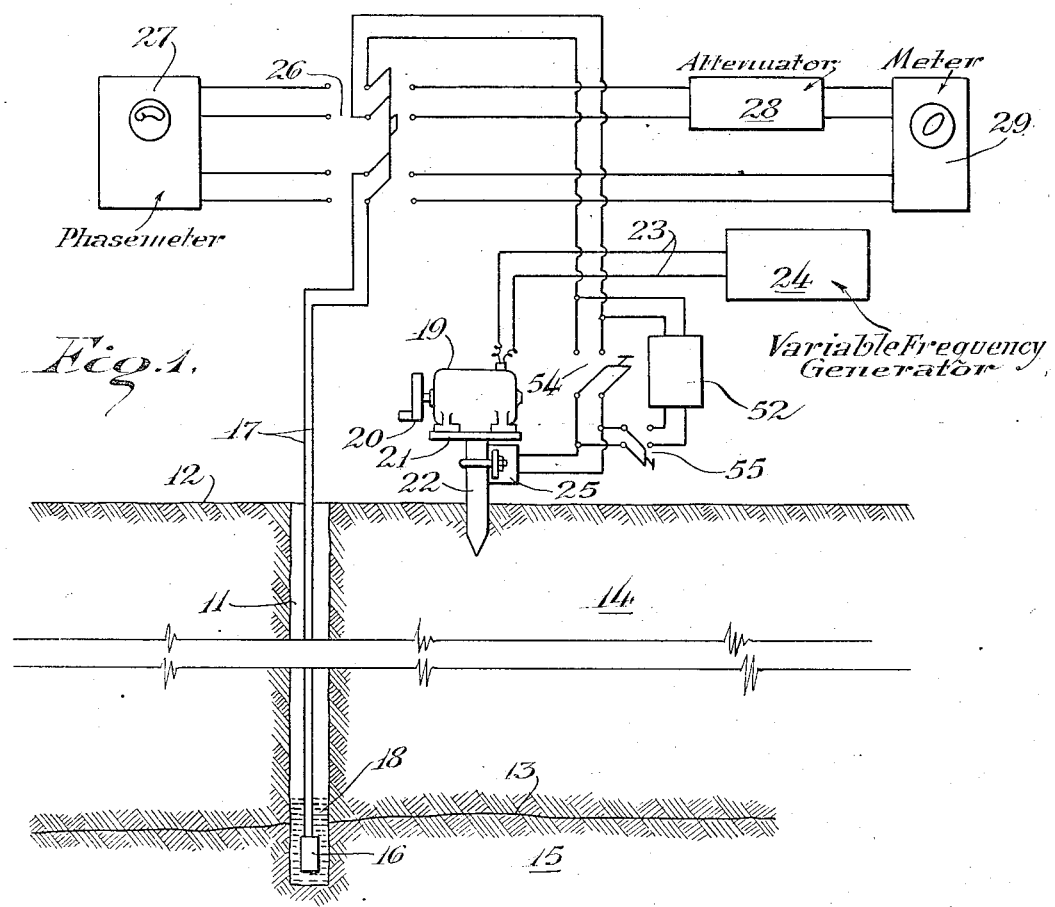
Figure 1 is a diagrammatic cross section of the surface of the earth including the weathered layer and one preferred arrangement of equipment used for determining the transmission characteristics of the weathered layer.

In Figure 1 I have shown one method of determining the amplitude or the phase transmission characteristics of the weathered zone. A shot hole 11 has been drilled from the surface of the earth 12 to a point below the interface 13 between the weathered zone 14 and the first consolidated bed 15. Such a shot hole would normally be drilled for the seismic surveying operations, and hence is available at the scene of operations. However, a separate well or wells can be drilled if desired. In regions where the weathered zone has rapidly lateral variation in characteristics this last procedure is particularly advantageous. In accordance with my invention seismic waves are transmitted approximately vertically through the weathered layer between a source and a receiver one of which is located at the surface of the earth and the other one of which is located at or slightly below the interface 13.

In the particular embodiment shown the receiver of seismic waves has been positioned in the shot hole 11 and the source of seismic waves is shown at the surface, but of course the reverse arrangement could be used with equal value. The receiver 16 is a seismometer or electric transducer which produces electric waves in response to seismic waves impinging upon it. It is connected to the surface by a pair of insulated conductors 17. Preferably more intimate contact between the walls of the shot hole 11 and the seismometer 16 than would otherwise be possible is obtained by the use of water tamping 18. This is not entirely requisite, however.

Various methods of generating seismic waves can be employed. For example, an electro-dynamic inertia vibrator resembling well-known types of cement tampers can be satisfactorily employed. In Figure 1 I have shown a continuous wave generator the frequency of which can be varied widely, consisting of an electric motor 19, connected to an unbalanced fly wheel 20 and mounted on a base 21 which is composed in part of a rod 22. This rod is driven into the ground for a foot or so in order to give intimate contact therewith. Electric motor 19 is driven through a pair of conductors 23 by an adjustable frequency electric generator 24. By this means I am able to generate continuous seismic waves the frequency of which can be adjusted to be as great as that of the highest frequency components of the reflected seismic wave trains which are considered of interest.

In order to determine the amplitude or phase transmission characteristics of the weathered layer it is necessary to know the amplitude or phase of the seismic wave generated in order to have a reference quantity. One convenient way to obtain this information is to fasten securely a reference seismometer 25 to the rod 22 of the seismic wave generator, since the seismic waves are produced in synchronism with the motion of the rod.

In order to compare the amplitude or phase relationship of the generated and received waves the output of the two seismometers 16 and 25 are connected, for example, by means of a four pole double throw switch 26 to a phase meter 27 or to an attenuation meter arrangement including attenuator 28 and meter 29.

If the phase characteristic is to be observed the four pole double throw switch 26 is closed to the left and the relative phase angle between the electric wave generated by seismometer 25 and that generated by seismometer 16 is determined. If desired both phase and amplitude characteristics can be simultaneously determined by incorporating an amplitude comparator and a phase meter in the same apparatus. One convenient phase and amplitude meter for such operations was described by Mr. Joseph D. Eisler in a paper before the Society of Exploration Geophysicists in Houston, Texas, on April 2, 1941. Other types may, of course, be used if desired.

If the attenuation characteristic alone is to be determined the four pole double throw switch 26 is closed to the right and, by means of adjustable attenuator 28 the output of the reference seismometer 25 is attenuated until it is equal to that of the seismometer 16. This may be accomplished by connecting alternately to the leads from seismometer 16 and to the leads from the attenuator 28 a voltmeter such as a vacuum tube voltmeter, or it may be accomplished as shown in Figure 1 by connecting the respective sets of leads to the vertical and horizontal plates of a cathode oscilloscope used as a meter 29, and adjusting the attenuator 28 until the vertical and the horizontal deflection of the oscilloscope figure are identical. Identical amplifiers can be interposed between seismometers and oscilloscope if desired.

Since the phase and the attenuation transmission characteristics are uniquely related it is not necessary that both of these be determined. Normally I prefer to determine the attenuation characteristic over a sufficiently wide band of frequencies so that it covers the range of frequencies to be found in the components of the usual seismic reflection wave train. It is seldom that measurements need to be made outside the band of frequencies lying between 20 and 200 cycles, respectively. One such attenuation-frequency transmission characteristic is shown as curve B of Figure 3. The relative amplitude of the received steady-state waves at the various frequencies is seen to decrease with increased frequency, which is usually the case. It is obvious from this curve that the high frequency components of any reflected seismic wave train will be highly attenuated. The transmission of seismic wave trains through a zone having a transmission characteristic which discriminates certain frequency components relative to others, typified by the type of curve shown at B in Figure 3 will introduce distortion and tend to cause all of the otherwise correlatable wave trains to be recorded with non-correlatable wave forms. It is a well known fact that the "character" of a wave train, i. e. its distinguishable characteristics which differentiate it from other wave trains, becomes more noticeable as the number of frequency components of appreciable magnitude increases.

Figure 3:
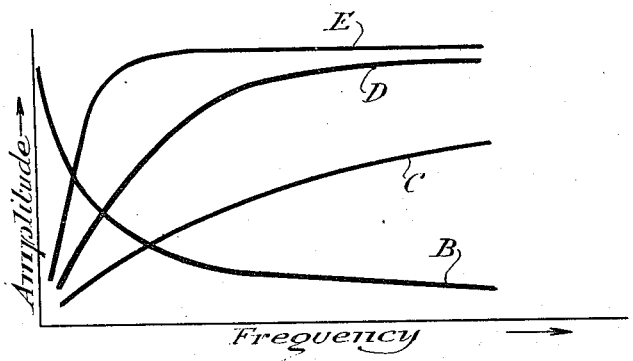
Figure 3 is a plot of the amplitude-frequency characteristics of various corrective networks, and of a representative section of weathered layer.

I have found that it is possible to eliminate the more serious consequences of the type of distortion produced by the weathered zone by incorporating in the seismic recording apparatus electrical networks which offset the effects produced by the weathered zone. Thus, for example, if the weathered zone acts as a low pass filter, as shown in Figure 3, a high pass filter incorporated in the amplifying circuits of the seismic recording system can be used to restore the various frequency components of any wave train to the same relative values which they had before entering the weathered layer. A network which produces this result is known as an inverse network, i. e. its characteristic distortion is inverse to the type of amplitude distortion produced by the weathered zone.

Figure 2:
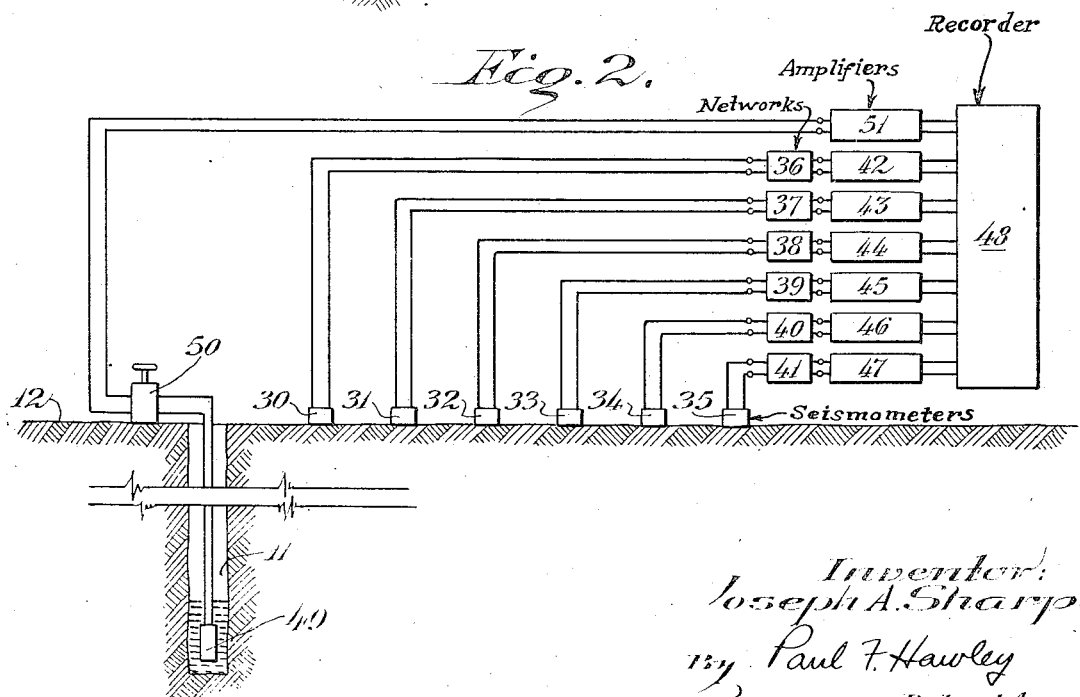
Figure 2 is a diagrammatic representation of a section of the earth's crust with seismic prospecting equipment placed thereon illustrating one arrangement of equipment by means of which the seismic recording system compensates for the distortion in the reflected waves due to the low velocity zone.

In Figure 2 I have shown one possible arrangement of seismic recording equipment utilizing this principle. Six seismometers 30—35 are shown placed on the surface of the ground near the shot hole 11. It is obvious, of course, that any desired number of seismometers in any configuration could be used. The output of each one of these seismometers is connected to a corrective network 36—41, the characteristics of which are inverse to those of the weathered layer, as already determined. Outputs from these networks are amplified by amplifiers 42—47 and simultaneously recorded by the seismic wave recorder 48 which may be of any of the well known types. The instant at which the charge of explosive 49 in the shot hole 11 is detonated is recorded in the customary manner by connecting a pair of wires from the blaster 50 to an amplifier 51 which in turn is connected to one of the recording galvanometers in the recorder 48.

These corrective networks 36—41 can be made up in the form of sets of small, compact, plug-in filter sections, each set having a given amplitude-frequency and phase-frequency transmission characteristic. They can be, for example, wave filters of the constant K type, although other networks can be employed if desired. The amplitude-frequency characteristics of three of such sets of filters are shown as curves C, D and E on Figure 3. The observer, after having determined a transmission characteristic of the weathered layer such as curve B, would thereupon choose the set of filters having the characteristic D as having the most nearly inverse characteristic to that of the weathered zone. On the other hand, if it is preferred, only one set of corrective networks, having variable elements, can be employed and the values of these elements can be shifted in a manner well known in electrical engineering until the inverse characteristic of that of the weathered zone is obtained.

It is found that it is not necessary to have the characteristics of the network employed perfectly inverse to the characteristics of the weathered layer. A recognizable characteristic reflection can be obtained if the correction of the corrective networks are so chosen that the distortion is reduced to a relatively low level. It is apparent that no arbitrary value can be set for the maximum error in filter constants that can be permitted since that depends upon the area to be prospected and the ability of the computer to recognize correlatable waves. Even a small amount of correction will usually produce results all out of proportion to the effort expended.

It sometimes happens that it is desirable to eliminate only a certain portion of the distortion due to the weathered zone and to leave a certain residual, relatively constant, distortion. This, for example, might be the case in which a certain region had already been investigated, in which it was later determined that the distortion due to the weathered zone was approximately a constant, and it was subsequently desired to supplement the results of this survey in an adjoining region in which the distortion due to the weathered zone varied widely. In such case it is possible to leave a certain amount of distortion in the later records by the following device: The leads from seismometer 25 are opened at the switch 54 and are connected through switch 55 to a network 52. This network 52 has been chosen so that it has the residual distortion desired. The output from this network is connected to the leads which were formerly connected to the seismometer 25. Now all of the measurements that are made either on the phase or on the transmission characteristic will be made relative to this network and hence the amount of distortion which is corrected will be the difference between the total amount and that present in the network 52.

Figure 4:
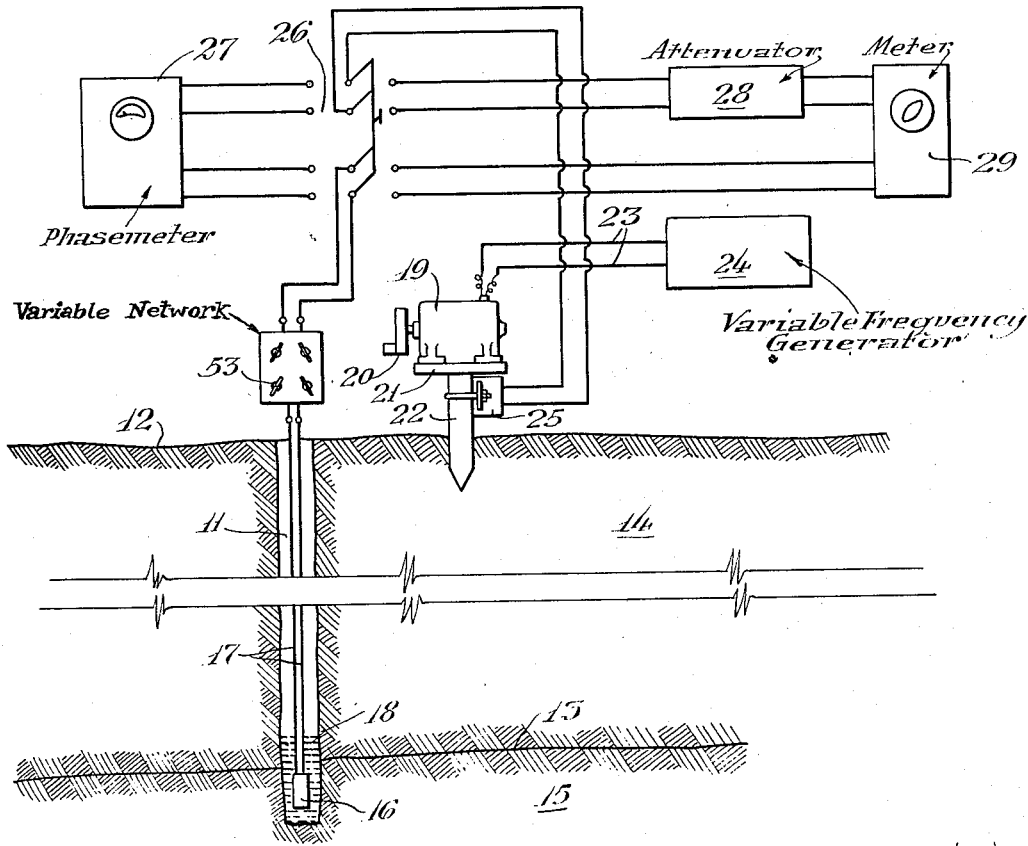
Figure 4 is a representation of a modified arrangement similar to that shown in Figure 1 illustrating a method of adjusting the corrective networks used in the apparatus shown in Figure 2.

Another method of operation in which the characteristics of the weathered layer are not determined but are merely corrected is illustrated by Figure 4. Here the output of the seismometer 16 is connected to the input of a variable network 53 which is later to be used as one of the filters 36—41 in the seismic surveying operation proper. The output of this network 53 is connected to one pair of terminals on the phase shift meter 27 and the output from the reference seismometer 25 is connected to the other pair of terminals. Manipulation of the network parameters is then employed to secure zero phase difference at all frequencies within the range of interest. Similarly, the attenuation at all frequencies under consideration can be made equal to zero by suitable manipulation of the parameters while connecting the output of the network to the meter 29. In this case the attenuator 28 is kept at a constant reading. After the constants of this network 53 have been adjusted to the desired value the network is then removed. A set of networks is then arranged so that each network has the same characteristics as that of adjusted network 53, and the set is employed in the manner illustrated in Figure 2.

It is apparent from electrical theory that the position of the compensating networks 36—41 is immaterial. Thus, for example, these networks might be incorporated in the amplifiers, or they could be placed between the amplifier and the recorder unit, etc.

Although I prefer to use the steady state technique described above a transient source can also be employed. Such a transient, for example, could be a recurrent square wave or a succession of damped sine wave trains. Even an impulse such as the detonation of a blasting cap could be employed. In this last method of arriving at the compensation a series of caps are exploded on one side of the weathered zone and a record is made of the resultant wave on the opposite side of the weathered layer, using a different filter each time, until a satisfactory duplicate of a record at a reference station is obtained. Even the results of this crude method are superior to no compensation whatsoever.

Another advantageous use of the apparatus described above consists in determining from the phase shift measurements the travel time of seismic waves between the source of the steady state waves and the well seismometer. This information is of particular value if related to the known or determinable main frequency component of the reflected seismic waves. By dividing the phase shift at this frequency expressed in radians, by $2\pi$ times the frequency of this component, the travel time or delay time of the waves passing upward through the section between the shaker and the seismometer is determined. This time delay can be used in order to obtain the true travel time of the reflected seismic waves from the source back up to the previous location of the well seismometer in the well below the weathered zone by subtracting from the total travel time of the reflected waves the time interval just obtained. By obtaining the time delay for waves of different frequencies it is possible to apply to each recorded reflected seismic wave the correct time delay to be used, by employing in each case the time delay corresponding to the main frequency component or selected frequency component of the recorded selected seismic wave. Previously this could not be accomplished satisfactorily because the methods of determining the so-called weathered layer time involved exploding a charge of dynamite in the well and recording the travel time for the resultant waves to reach the surface. Since the frequency of the pulse could not be controlled, the time obtained was for waves of an arbitrary wave form involving a steep wave front, made up largely of components the frequency of which is considerably higher than that of the reflected waves. Since I have found that in general the true travel time is different for waves of different frequencies, it follows that the correction which was applied to the recorded reflected seismic waves (which were in general of lower frequency than that of the pulse from the dynamite) was an incorrect value of the travel time. By the method which I have outlined immediately above such errors are avoided.

It is obvious that this type of time correction can be applied to correct for transmission not only through the weathered zone but through any section of the earth's crust from the surface thereof down to the depth at which the well seismometer is placed. For example, if it is desired to subtract from each travel time of the reflected seismic waves the travel time corresponding to the last 500 feet of formations beneath the seismometers, it is merely necessary to bore the well used in connection with the apparatus shown in Figure 1 to a depth slightly greater than 500 feet and lower the well seismometer 16 to this 500-foot mark and proceed with the phase measurements as outlined above. This technique is particularly advantageous in connection with the well-known method of seismic prospecting called "shooting to a plane" in which the travel times of all reflections are corrected to yield the travel times at which the reflected waves would arrive at instruments placed at a fixed plane some distance below the surface of the earth.

Although this invention has been described in connection with certain illustrations and embodiments thereof, the invention is not so limited and it will be immediately apparent to those skilled in this art that wide variations in the technique of obtaining compensation for changes in wave form of reflected seismic waves due to their passage through the ground can be applied without departing from the spirit of the invention. The invention is best described and set forth in the appended claims.

I claim:

1. In seismic prospecting, the steps of determining a transmission characteristic of a section of the crust of the earth including the weathered zone by generating continuous waves at frequencies within the range of 20 to 200 cycles per second at a point on one boundary of said section, receiving said waves at a second point on the opposite boundary of said section approximately vertically displaced from said first-mentioned point, and obtaining the relative magnitudes of a characteristic of said continuous waves at said first-mentioned and said second points.

2. A method for determining a transmission characteristic of an electric network used in a seismic recording circuit for compensating for wave form distortion of seismic waves due to their passage through the weathered zone, comprising generating continuous seismic waves near one boundary of said weathered zone, receiving said continuous waves at a point near the other boundary of said weathered zone and approximately vertically spaced with respect to the point of generation, determining a characteristic of the received waves relative to the same characteristic of the generated waves, and repeating said determination at a series of different frequencies.

3. Apparatus for the determination of a transmission characteristic of the weathered zone below a seismic recording station comprising a source of seismic waves positioned at one boundary of said weathered zone, a seismometer positioned at the other boundary of said weathered zone and approximately vertically located with respect to said source of seismic waves, means for determining a characteristic of said seismic waves at said source, and means for comparing said characteristic with the corresponding characteristic of the output from said seismometer.

4. Apparatus for the adjustment of a transmission characteristic of an adjustable network for employment in the recording of the output of at least one seismometer sensitive to seismic waves traversing the weathered zone prior to arrival at said seismometer, comprising a source of continuous seismic waves positioned at one boundary of said weathered zone, a first seismometer placed immediately adjacent said source, a second seismometer positioned at the other boundary of said weathered zone and approximately vertically located with respect to said source of continuous seismic waves, and connected to said corrective network, and means for comparing a characteristic of the output of said corrective network with the output of said first seismometer.

5. In apparatus for seismic reflection prospecting, means for reducing wave form distortion in reflected seismic waves due to their passage through the weathered zone comprising an electrical corrective network a transmission characteristic of which is substantially inverse to the corresponding characteristic of said weathered zone, and means for adjusting said network transmission characteristic including a source of continuous seismic waves on the surface of the earth at the region of interest, a seismometer adjacent said source, a second seismometer positioned at the bottom of the weathered zone approximately vertically below said source, said second seismometer being connected to said network, and a means for comparing a parameter of the output of said first seismometer and the output of said network.

JOSEPH A. SHARPE.